United States Patent [19]

Suzuki et al.

[11] 4,442,360
[45] Apr. 10, 1984

[54] RADIATION DETECTOR

[75] Inventors: Atsushi Suzuki, Higashiyamato; Hiromichi Yamada, Hino; Yoko Uchida, Kawasaki; Hideki Kohno, Tokyo; Fukino Tadashi, Hachioji; Minoru Yoshida, Tokyo, all of Japan

[73] Assignee: Hitachi Medical Corporation, Tokyo, Japan

[21] Appl. No.: 257,426

[22] Filed: Apr. 24, 1981

[30] Foreign Application Priority Data

Apr. 25, 1980 [JP] Japan .................. 55-54156

[51] Int. Cl.³ .................. G01T 1/20; G01J 1/58
[52] U.S. Cl. .................. 250/486.1; 250/483.1; 252/301.45
[58] Field of Search .................. 250/483.1, 486.1; 252/301.45

[56] References Cited

U.S. PATENT DOCUMENTS 3,974,389 8/1976 Ferri et al. .................. 250/483.1
4,317,037 2/1982 Suzuki et al. .................. 250/486.1

FOREIGN PATENT DOCUMENTS 2037800 7/1980 United Kingdom .................. 252/301.45

OTHER PUBLICATIONS

"Terbium-Activated Rare Earth Oxide Sulfide Phospher", Kubo et al., Electric Phenomena, vol. 88, 1978, pp. 82738, 252-301.45.

Primary Examiner—Bruce C. Anderson
Attorney, Agent, or Firm—Antonelli, Terry & Wands

[57] ABSTRACT

A radiation detector comprising a scintillator exhibiting luminescence by the action of radioactive rays and a light detector detecting light output of said scintillator, characterized in that said scintillator is a phosphor represented by the formula:

$$(A_{1-x-y}Ln_xCe_y)_2O_2S:X$$

wherein A is at least one element selected from the group consisting of Y, La and Gd; Ln is at least one element selected from the group consisting of Pr, Tb and Eu; and X is at least one element selected from the group consisting of F, Cl and Br; and the values of x and y are $0.000003 \geq x \geq 0.2$, and $0.000001 \geq y \geq 0.005$, and the amount of X is 0 to 1000 ppm on weight basis, has a very short after glow time because of having Ce in the phosphor.

13 Claims, 3 Drawing Figures

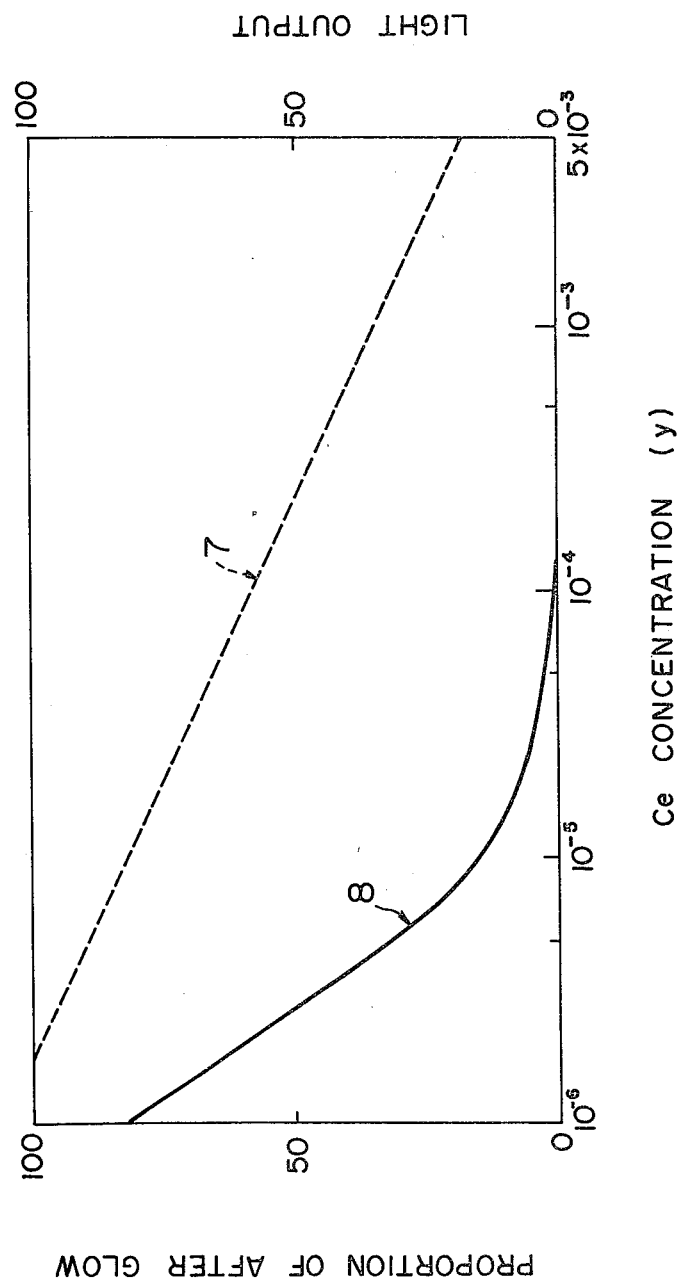

RADIATION DETECTOR

BACKGROUND OF THE INVENTION

This invention relates to a radiation detector for X-rays, γ-rays and the like, and particularly to a radiation detector for use in X-ray CT (computerized tomography), positron camera and the like.

In X-ray CT, X-ray beams radiated from the X-ray source extend fanwise, pass through an object and are detected by a radiation detection system. This detection system is so constructed that 30–1,000 radiation detectors uniform in performance are placed side by side on the circular arc surrounding the X-ray source placed at the center. When the spread of X-ray fan beams is narrow, the detector may also be placed on a straight line. The X-ray source and the radiation detection system are rotated around the object. The output of each radiation detector is measured at predetermined interval of angle (for example, 1 degree) and tomography of the object is reconstructed from the output of each radiation detector.

As radiation detectors for use in X-ray CT and the like, there have hitherto been used those detectors like a xenon ionization chamber or bismuth germanate (abbreviated to BGO) combined with photomultiplier tubes. In these detectors, it was difficult to adjust the characteristics between channels so that a sufficiently clear image was difficult to be obtained with an apparatus using them. Particularly, in a detector in which BGO is combined with photomultiplier tubes, it was quite difficult to adjust the characteristics of detectors one another because of the dispersion in the characteristics of BGO single crystal used as a scintillator and the dispersion in the characteristics of photomultiplier tubes.

In order to solve this problem, some of the present inventors previously proposed a radiation detector in which phosphor particles were used as a scintillator (Japanese Utility Model Application Kokai (Laid-Open) No. 179,782/79). For the purpose of obtaining a tomography of high accuracy in a radiation detector for conventional X-ray CT, the width of the scintillator is about 1–10 mm and preferably about 1–3 mm and the length thereof is about 20 mm, for example. Accordingly, the number of phosphor particles in one radiation detector is, for example, about 300,000, though it may vary depending on the particle size. Although individual phosphor particles may possibly be slightly different from one another in characteristics, the dispersion in the characteristics as a scintillator can be made about one divided by the square root of particle number or about 0.01% by sufficiently mixing them and using the mixture as one scintillator, whereby a satisfactory result can be obtained. A radiation detector resembling to the above-mentioned one is also disclosed in Japanese Patent Application Kokai (Laid-Open) No. 90,089/79.

On the other hand, when phosphor particles are used as scintillator, detection of luminescence drops to 70–90% as compared with the case of using the single crystal. Therefore, it is preferable to use a phosphor having high radiation absorbancy and high conversion efficiency from radiation to light, such as rare earth metal acid sulfide type phosphors typified by $(Gd, Pr)_2O_2S$ and the like. However, it was revealed that there occurs in these phosphors a phenomenon of after glow, i.e. slight luminescence observed when a long period of time (1/1,000–1/100 second or longer) has passed after stopping the irradiation with X-ray. For this reason, these phosphors cannot be used in the radiation detector for some kinds of X-ray CT, or a complicated apparatus must be involved in the detection system for the purpose of eliminating the influence of after glow.

On the other hand, the following references are also known to show the state of the art: i.e. U.S. Pat. Nos. 4,031,396 and 4,071,760.

SUMMARY OF THE INVENTION

An object of this invention is to provide a radiation detector in which a phosphor having high conversion efficiency and a short after glow time is used as scintillator.

Another object of this invention is to provide a radiation detector in which a scintillator capable of easily making uniform the performances of plural radiation detectors is used.

These objects and other objects can be achieved by a radiation detector comprising a scintillator exhibiting luminescence by the action of radioactive rays and a light detector detecting the light output of said scintillator, characterized in that said scintillator is a phosphor represented by the following general formula:

$$(A_{1-x-y}Ln_xCe_y)_2O_2S:X \qquad (I)$$

wherein A is at least one element selected from the group consisting of Y, La and Gd; Ln is at least one element selected from the group consisting of Pr, Tb and Eu; and X is at least one element selected from the group consisting of F, Cl and Br; and x is a value falling in the following range:

$$0.000003 \leq x \leq 0.2;$$

y is a value falling in the following range:

$$0.000001 \leq y \leq 0.005;$$

and the amount of X is in the range of 0–1,000 ppm (by weight).

BRIEF DESCRIPTION OF THE DRAWINGS

FIG. 3 is a graph illustrating the relation between the Ce concentration and proportion of after glow or light output, for the purpose of explaining this invention.

DETAILED DESCRIPTION OF PREFERRED EMBODIMENTS

Figure 1:
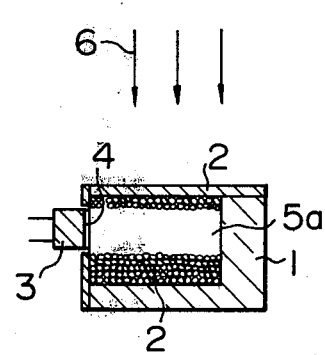
FIG. 1 and FIG. 2 are sectional views illustrating the radiation detector of one example of this invention.

The phosphor used in this invention gives short after glow and has high conversion efficiency.

A cause of the after glow is considered to be the contribution of electron or hole thermally released from the trap which is formed by lattice defects to the luminescence. Accordingly, it is enough for the present purpose to reduce the number of such defects giving shallow traps or to add another additive capable of substantially suppressing the action of the shallow traps. In the above-mentioned phosphor, cerium (Ce) is considered to perform the latter action.

In this invention, both phosphors containing at least one halogen atom represented by X in the general formula and phosphors not containing said halogen atom in the general formula can be used. In general, however, phosphors containing said halogen atom in an amount of 2–1,000 ppm are more preferable because of higher brightness. Particularly, to contain said halogen atom in an amount of 5–250 ppm is more preferable because the effect of improving brightness is more excellent.

As the element represented by Ln, at least one of Pr, Tb and Eu can be used and Pr and/or Tb are more preferable. Further, Pr is most preferable as the Ln from the viewpoint of matching between the wavelength of luminescence of phosphor and the light detector.

In phosphors wherein the element represented by Ln is Pr, the addition of a halogen atom exhibits a marked effect in improving brightness whether X is F or Cl. However, when X is Br, the effect is rather small. On the other hand, in phosphors wherein the element represented by Ln is Tb, the effect of improving brightness is marked when X is F, but the effect is rather small when X is Cl, and the effect becomes smaller when X is Br. For this reason, F is the most preferable as the element represented by X, and Cl is the next.

As will become apparent in the examples mentioned later, the phosphor can be produced by firing a compound containing an element represented by A in the general formula, a compound containing an element represented by Ln, a Ce compound, an element represented by X or a compound containing said element and a S-containing compound yielding an alkali metal sulfide upon heating or mixtures thereof. The firing temperature is preferably in the range of 900°–1300° C.

It is preferable to use the phosphor having an average particle size of about 1–200 $\mu$m, though it is also possible to use a single crystal of phosphor.

In such a type of X-ray CT wherein, for example, detectors are circumferentially arranged around the object and only the X-ray source is rotated, dispersion between individual detectors does not present so important a problem. Therefore it is preferable to use the single crystal for enhancing sensitivity. The phosphors used in this invention can be made into single crystal by applying the method of making single crystal from other phosphors mentioned in J. Appl. Phys., Vol. 42, page 3049 (1971).

The phosphor is preferably arranged in a container having a light-reflective inner wall. For examples, there are used containers of which inner wall have a reflecting film of high reflectance against visible light and near infrared light, such as aluminium or silver. Though the light detector may be placed in the container, it is usually preferable to place the light detector outside the container, to provide the container with a light transmitting window and to lead the luminescence from the phosphor to the light detector through said light transmitting window. Further, an optical guide may be placed between the light transmitting window and the light detector.

Except for the incidence area of radioactive rays the container may be covered with a substance interrupting radioactive rays, such as tungsten or lead, or a container made of such a substance may be used. However, when there are a series of collimators before the radiation detection system, no interruption substance is particularly necessary.

Figure 2:
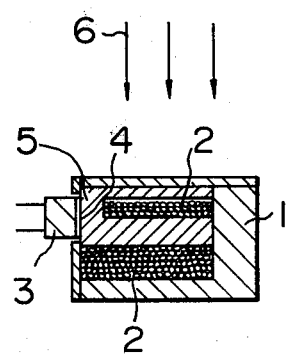

Examples of the radiation detection system of this invention are illustrated in FIGS. 1 and 2. Phosphor particles 2 as a scintillator are placed inside a container 1. The inner wall of the container 1 is coated with a light reflective film, except for a light transmitting window 4. Numerals 5a and 5b denote optical quides, wherein 5a is a mere space leading the luminescence of scintillator to the light detector and 5b is an acrylic resin playing a similar role. Radioactive ray 6 is projected from the upper part of the drawing into the radiation detector.

In FIG. 3, the proportion of after glow obtained when a phosphor of $(Gd_{0.997-y}Pr_{0.003}Ce_y)_2O_2S:F$ is used as scintillator is shown, wherein the after glow of a sample containing no Ce is taken as 100. The excitation of phosphor is effected with an X-ray (120 KV) having a rectangular pulse of 4 msec. Under the same excitation conditions, the light output decreases as shown by the dotted line 7 as the concentration of Ce (expressed in term of atomic ratio to the total trivalent rare earth ions) increases. On the other hand, the proportion of after glow is expressed by the curve 8, wherein an average value of light output between 2 msec to 14 msec after stopping the excitation with X-ray is normalized with the light output under excitation with X-ray. As is clear from the drawing, when the y value of Ce concentration falls in the range of $0.000001 \leq y \leq 0.005$, the proportion of after glow rapidly decreases while the decrease in light output is not so great. This tendency is particularly remarkable when y is in the range of $0.000001 \leq y \leq 0.0001$, which is more preferable. In FIG. 3, the value of ordinate 100 corresponds to about 1/500 of the light output under excitation, so far as the above-mentioned experimental conditions are adopted.

The phosphor used in this invention can also be used in X-ray intensifying screens and the like. In such a case, a phosphor in which Ln of the general formula is Tb is preferable in that its luminescence spectra well matches with the characteristics of film.

This invention will be explained in more detail by way of the following Examples.

EXAMPLE 1

| | |
|---|---|
| $Gd_2O_3$ | 33.5200 g |
| $GdPO_4$ | 4.0236 g |
| $Pr_6O_{11}$ | 0.1022 g |
| $Ce(NO_3)_3.6H_2O$ | 0.0013 g |

The above-mentioned ingredients were weighed in a beaker, to which water was added and mixed sufficiently. The mixture was then dried. This dry powder was placed in a 200-ml bottle made of acrylic resin, to which were added and mixed sufficiently by rolling the following materials:

| | |
|---|---|
| $Na_2CO_3$ | 9.5720 g |
| S | 9.5610 g |
| $K_3PO_4.3H_2O$ | 3.2330 g |
| $Na_2P_2O_7$ | 0.9839 g |
| $NH_4PF_6$ | 0.4889 g. |

The resulting mixed starting material was packed in an alumina crucible having a volume of 50 ml. After putting an alumina lid on the crucible, the mixture was fired at 1,180° C. for 3 hours in air. The yellow colored fired product was taken out of the alumina crucible, immediately immersed in pure water and agitated with a stirrer. Because of the dissolution of sodium sulfide $Na_2S_x$, the solution turned yellow. After repeating washing with water until the solution became colorless, it was passed through a 200 mesh (Tyler standard) sieve.

After removing the supernatant liquid by decantation, 500 ml of 0.15 N aqueous solution of HCl was added thereto and stirred for one hour. After the treatment with HCl, it was washed with pure water until conductivity of the washing liquid became 10 $\mu\sigma$/cm or less, and the phosphor thus obtained was dried at 140° C. The thus obtained phosphor had the following composition:

$$(Gd_{0.997}Pr_{0.003}Ce_{15\times10^{-6}})_2O_2S:(F)$$

The luminescence intensity of this phosphor under X-ray excitation was 81, taking the luminescence intensity of a phosphor synthesized in the same manner as above without adding Ce as 100. The after glow component intensity of this phosphor was 9.7, taking that of the phosphor containing no Ce as 100. Its luminescence spectrum was nearly the same as that of the phosphor containing no Ce, this fact being the same throughout all the examples mentioned below.

The amount of the above-mentioned F was 80 ppm by weight. If the luminescence intensity of a phosphor containing no F was taken as 100, the luminescence intensity of this phosphor was 123. When the quantity of Ce (y) was controlled and adjusted to $1\times10^{-5}$, $6\times10^{-6}$ and $3\times10^{-6}$, the luminescence intensity was 131, 140 and 147, respectively, taking that of the phosphor containing no F as 100.

EXAMPLE 2

| | |
|---|---|
| $Y_2O_3$ | 20.7149 g |
| $YPO_4$ | 2.9335 g |
| $Pr_6O_{11}$ | 0.1022 g |
| $Ce(NO_3)_3 \cdot 6H_2O$ | 0.0013 g |

The above-mentioned ingredients were weighed in a beaker, to which was added water and mixed sufficiently. The mixture was then dried. This dry powder was placed in a 200-ml bottle made of acrylic resin, to which were added and mixed sufficiently by rolling the following materials:

| | |
|---|---|
| $Na_2CO_3$ | 9.5720 g |
| S | 9.5610 g |
| $K_3PO_4 \cdot 3H_2O$ | 3.2330 g |
| $Na_2P_2O_7$ | 0.9839 g |
| $NH_4PF_6$ | 0.4889 g. |

Then, the procedure of Example 1 was repeated. The phosphor thus obtained had the following composition:

$$(Y_{0.997}Pr_{0.003}Ce_{15\times10^{-6}})_2O_2S:(F)$$

The luminescence intensity of this phosphor under X-ray excitation was 83, taking that of a phosphor synthesized in the same manner as above without adding Ce as 100. The after glow component intensity of this phosphor was 9.9, taking that of the phosphor containing no Ce as 100.

EXAMPLE 3

| | |
|---|---|
| $La_2O_3$ | 29.8873 g |
| $LaPO_4$ | 3.7311 g |
| $Pr_6O_{11}$ | 0.1022 g |
| $Ce(NO_3)_3 \cdot 6H_2O$ | 0.0013 g |

The above-mentioned ingredients were weighed in a beaker, to which was added water and mixed sufficiently. The mixture was then dried. This dry powder was placed in a 200 ml bottle made of acrylic resin, to which were added and mixed sufficiently by rolling the following materials:

| | |
|---|---|
| $Na_2CO_3$ | 9.5720 g |
| S | 9.5610 g |
| $K_3PO_4 \cdot 3H_2O$ | 3.2330 g |
| $Na_2P_2O_7$ | 0.9839 g |
| $NH_4PF_6$ | 0.4889 g. |

Then, the procedure of Example 1 was repeated. The phosphor thus obtained had the following composition:

$$(La_{0.997}Pr_{0.003}Ce_{15\times10^{-6}}):(F)$$

The luminescence intensity of this phosphor under X-ray excitation was 80, taking that of a phosphor synthesized in the same manner as above without adding Ce as 100. The after glow component intensity of this phosphor was 9.5, taking that of the phosphor containing no Ce as 100.

EXAMPLE 4

| | |
|---|---|
| $Gd_2O_3$ | 15.2258 g |
| $Y_2O_3$ | 11.2242 g |
| $GdPO_4$ | 4.0358 g |
| $Pr_6O_{11}$ | 0.1022 g |
| $Ce(NO_3)_3 \cdot 6H_2O$ | 0.0013 g |

The above-mentioned ingredients were weighed in a beaker, to which was added water and mixed sufficiently. Then, the mixture was dried. This dry powder was placed in a 200-ml bottle made of acrylic resin, to which were added and mixed sufficiently by rolling the following materials:

| | |
|---|---|
| $Na_2CO_3$ | 9.5720 g |
| S | 9.5610 g |
| $K_3PO_4 \cdot 3H_2O$ | 3.2330 g |
| $Na_2P_2O_7$ | 0.9839 g |
| $NH_4PF_6$ | 0.4889 g. |

Then, the procedure of Example 1 was repeated. The phosphor thus obtained had the following composition:

$$(Gd_{0.5}Y_{0.497}Pr_{0.003}Ce_{15\times10^{-6}})_2O_2S:(F)$$

The luminescence intensity of this phosphor under X-ray excitation was 82, taking that of a phosphor synthesized in the same manner as above without adding Ce as 100. The after glow component intensity of this phosphor was 9.6, taking that of the phosphor containing no Ce as 100.

EXAMPLE 5

| | |
|---|---|
| $Gd_2O_3$ | 15.2258 g |
| $La_2O_3$ | 16.1942 g |
| $GdPO_4$ | 4.0358 g |
| $Pr_6O_{11}$ | 0.1022 g |
| $Ce(NO_3)_3 \cdot 6H_2O$ | 0.0013 g |

The above-mentioned ingredients were weighed in a beaker, to which was added water and mixed sufficiently. Then, the mixture was dried. This dry powder was placed in a 200-ml bottle made of acrylic resin, to which were added and mixed sufficiently by rolling the following materials:

| | |
|---|---|
| Na$_2$CO$_3$ | 9.5720 g |
| S | 9.5610 g |
| K$_3$PO$_4$.3H$_2$O | 3.2330 g |
| Na$_2$P$_2$O$_7$ | 0.9839 g |
| NH$_4$PF$_6$ | 0.4889 g. |

Then, the procedure of Example 1 was repeated. The phosphor thus obtained had the following composition:

$$(Gd_{0.5}La_{0.497}Pr_{0.003}Ce_{15\times 10^{-6}})_2O_2S:(F)$$

The luminescence intensity of this phosphor under X-ray excitation was 80, taking the luminescence intensity of a phosphor synthesized in the same manner as above without adding Ce as 100. The after glow component intensity of this phosphor was 9.6, taking that of the phosphor containing no Ce as 100.

EXAMPLE 6

| | |
|---|---|
| Gd$_2$O$_3$ | 32.6850 g |
| GdPO$_4$ | 3.9550 g |
| Tb$_4$O$_7$ | 0.7437 g |
| Ce(NO$_3$)$_3$.6H$_2$O | 0.0017 g |

The above-mentioned ingredients were weighed in a beaker, to which was added water and mixed sufficiently. Then, the mixture was dried. This dry powder was placed in a 200-ml bottle made of acrylic resin, to which were added and mixed sufficiently by rolling the following materials:

| | |
|---|---|
| Na$_2$CO$_3$ | 9.5720 g |
| S | 9.5610 g |
| K$_3$PO$_4$.3H$_2$O | 3.2330 g |
| Na$_4$P$_2$O$_7$ | 0.9839 g |
| NH$_4$PF$_6$ | 0.4889 g. |

Then, the procedure of Example 1 was repeated. The Phosphor thus obtained had the following composition:

$$(Gd_{0.98}Tb_{0.02}Ce_{2\times 10^{-5}})_2O_2S:(F)$$

The luminescence intensity of this phosphor under X-ray excitation was 87, taking the luminescence intensity of a phosphor synthesized in the same manner as above without adding Ce as 100. The after glow component intensity of this phosphor was 1.2, taking that of the phosphor containing no Ce as 100.

EXAMPLES 7-11

| | |
|---|---|
| Gd$_2$O$_3$ | 33.250 g |
| GdPO$_4$ | 4.0236 g |
| Pr$_6$O$_{11}$ | 0.0341 g |
| Ce(NO$_3$)$_3$.6H$_2$O | 0.00026 g |

The above-mentioned ingredients were weighed in a beaker, to which was added water and mixed sufficiently. Then, the mixture was dried. This dry powder was placed in a 200-ml bottle made of acrylic resin, to which were added and mixed sufficiently by rolling the following materials:

| | |
|---|---|
| Na$_2$CO$_3$ | 9.5720 g |
| S | 9.5610 g |
| K$_3$PO$_4$.3H$_2$O | 3.2330 g |
| Na$_2$P$_2$O$_7$ | 0.9839 g |
| NH$_4$PF$_6$ | The amount mentioned in Table 1. |

Then, the procedure of Example 1 was repeated. The phosphor thus obtained had the following composition:

$$(Gd_{0.999}Pr_{0.001}Ce_{3\times 10^{-6}})_2O_2S:(F)$$

In Table 1 are listed the amount of NH$_4$PF$_6$ added, the F content in the phosphor, the luminescence intensity and the intensity of after glow component (those in the phosphor containing no Ce are taken as 100) in each example.

TABLE 1

| Example No. | Amount of NH$_4$PF$_6$ (g) | F content (ppm) | Luminescence intensity (1)* | Luminescence intensity (2)* | Intensity of after glow |
|---|---|---|---|---|---|
| 7 | 0.0163 | 2 | 102 | 96 | 45 |
| 8 | 0.032 | 5 | 110 | 97 | 44 |
| 9 | 0.4889 | 82 | 155 | 97 | 45 |
| 10 | 1.629 | 243 | 109 | 96 | 45 |
| 11 | 4.223 | 1,000 | 103 | 97 | 42 |

Note
(1)*Taken as 100 when no F was added.
(2)*Taken as 100 when no Ce was added.

EXAMPLE 12

The procedures of Examples 7–11 were repeated, except that NH$_4$PF$_6$ was replaced by 0.671 g of KCl. The Cl content of these phosphors was 69 ppm. The luminescence intensity was 152 when that of a phosphor containing no Cl was taken as 100, and it was 97 when that of a phosphor containing no Ce was taken as 100. The after glow component intensity was 47, taking that of a phosphor containing no Ce as 100.

What is claimed is:

1. A radiation detector comprising a scintillator exhibiting luminescence by the action of radioactive rays and a light detector detecting light output of said scintillator, characterized in that said scintillator is a phosphor represented by the formula:

$$(A_{1-x-y}Ln_xCe_y)_2O_2S:X \qquad (I)$$

wherein A is at least one element selected from the group consisting of Y, La and Gd; Ln is Pr; and X is at least one element selected from the group consisting of F, Cl and Br; and the values of x and y and the amount of X are as follows:

$0.000003 \leq x \leq 0.2$, $0.000001 \leq y \leq 0.005$, and

X=0 to 1000 ppm on weight basis.

2. A radiation detector according to claim 1, wherein the amount of X in the formula (I) is 2 to 1,000 ppm on weight basis.

3. A radiation detector according to claim 2, wherein X in the general formula is F.

4. A radiation detector according to claim 2, wherein X in the formula (I) is Cl.

5. A radiation detector according to any one of claims 1, 2, 3 and 4, wherein the value of y in the formula (I) is in the following range:

$$0.000001 \leq y \leq 0.001.$$

6. A radiation detector according to any one of claims 1, 2, 3 and 4, wherein said scintillator is placed in a container having a light reflective inner wall and having, in one part of it, a light transmitting window for leading the luminescence from the scintillator to said light detector.

7. A radiation detector according to any one of claims 1, 2, 3 and 4, wherein said phosphor is constructed of one or more layers of phosphor particles.

8. A radiation detector according to claim 7, wherein said phosphor is particles having an average particle size of 1-200 μm.

9. A radiation detector according to claim 7, wherein said layer of phosphor particle is provided so as to form a plurality of layers and an optical guide is provided on at least one side of each layer for leading the luminescence from the layer to the light detector.

10. A radiation detector according to any one of claims 1, 2, 3 and 4, wherein said scintillator is constructed of a single crystal of the phosphor represented by the formula (I).

11. A radiation detector according to claim 2, wherein the amount of X is 5-250 ppm.

12. A radiation detector according to claim 1, wherein A is Gd.

13. A radiation detector according to claim 12, wherein X is F.

* * * * *

UNITED STATES PATENT AND TRADEMARK OFFICE
CERTIFICATE OF CORRECTION

PATENT NO. : 4,442,360

DATED : April 10, 1984

INVENTOR(S) : Suzuki et al.

It is certified that error appears in the above-identified patent and that said Letters Patent is hereby corrected as shown below: Item [75]:

Title page, left-hand column, the name "Fukino Tadashi" should read --Tadashi Fukino--.

Signed and Sealed this

Thirtieth Day of April 1985

[SEAL]

Attest:

DONALD J. QUIGG

*Attesting Officer*  *Acting Commissioner of Patents and Trademarks*